(12) United States Patent
De Nora

(10) Patent No.: US 10,228,082 B2
(45) Date of Patent: Mar. 12, 2019

(54) EXTENSIBLE HOSE AND HOSE ASSEMBLY

(71) Applicant: Paolo De Nora, Sasso Marconi (IT)

(72) Inventor: Paolo De Nora, Sasso Marconi (IT)

( * ) Notice: Subject to any disclaimer, the term of this patent is extended or adjusted under 35 U.S.C. 154(b) by 169 days.

(21) Appl. No.: 15/311,621

(22) PCT Filed: Apr. 30, 2015

(86) PCT No.: PCT/IB2015/053156
§ 371 (c)(1),
(2) Date: Nov. 16, 2016

(87) PCT Pub. No.: WO2015/177664
PCT Pub. Date: Nov. 26, 2015

(65) Prior Publication Data
US 2017/0097111 A1    Apr. 6, 2017

(30) Foreign Application Priority Data

May 20, 2014    (IT) ............................. BO2014A0297

(51) Int. Cl.
| F16L 11/118 | (2006.01) |
| F16L 11/12 | (2006.01) |
| F16L 57/06 | (2006.01) |
| F16L 11/10 | (2006.01) |
| F16L 11/115 | (2006.01) |
| F16L 25/00 | (2006.01) |
| F16L 33/00 | (2006.01) |
| F16L 33/01 | (2006.01) |
| F16L 33/22 | (2006.01) |

(52) U.S. Cl.
CPC .............. *F16L 11/12* (2013.01); *F16L 11/10* (2013.01); *F16L 11/115* (2013.01); *F16L 25/0036* (2013.01); *F16L 33/003* (2013.01); *F16L 33/01* (2013.01); *F16L 33/224* (2013.01); *F16L 57/06* (2013.01)

(58) Field of Classification Search
CPC .......... F16L 11/12; F16L 11/112; F16L 11/18; F16L 11/005
USPC ................................ 138/118, 119, 121, 122
See application file for complete search history.

(56) References Cited

U.S. PATENT DOCUMENTS

| 956,077 | A | * | 4/1910 | Greenfileld | ............. | F16L 33/22 |
| | | | | | | 285/250 |
| 1,091,759 | A | * | 3/1914 | Paradis | .................... | F16L 33/01 |
| | | | | | | 138/126 |
| 3,623,513 | A | * | 11/1971 | Dinkelkamp | ........... | F16L 11/14 |
| | | | | | | 138/114 |

(Continued)

FOREIGN PATENT DOCUMENTS

| FR | 2 784 447 A1 | 4/2000 |
| FR | 2784447 B1 | 12/2000 |
| WO | 2013/105853 A1 | 7/2013 |

*Primary Examiner* — Patrick F Brinson
(74) *Attorney, Agent, or Firm* — McGlew and Tuttle, P.C.

(57) ABSTRACT

An extensible hose, comprising an inner tubular element (2) suitable, in use, for being passed through by a fluid, said inner tubular element (2) being made from a first elastically extensible material and suitable for lengthening and widening under the action of the pressure of the fluid. The hose (1) also comprises at least one extensible outer tubular element (3) overlying, and coaxial to, said inner tubular element (2), comprising at least one surface portion (4) made from a second material resistant to external stresses, and the like.

20 Claims, 8 Drawing Sheets

(56) References Cited

U.S. PATENT DOCUMENTS

| | | | | |
|---|---|---|---|---|
| 3,857,415 | A * | 12/1974 | Morin | F16L 11/112 |
| | | | | 138/122 |
| 4,063,757 | A * | 12/1977 | Fuhrmann | F16L 33/01 |
| | | | | 285/222.1 |
| 4,089,351 | A * | 5/1978 | Ward | F16L 11/15 |
| | | | | 138/109 |
| 4,683,917 | A * | 8/1987 | Bartholomew | F16L 11/118 |
| | | | | 138/109 |
| 5,263,646 | A * | 11/1993 | McCauley | B05B 15/652 |
| | | | | 239/154 |
| 5,988,226 | A * | 11/1999 | Matthews | F16L 11/12 |
| | | | | 138/109 |
| 6,523,539 | B2 * | 2/2003 | McDonald | A62B 7/14 |
| | | | | 128/205.25 |
| 7,168,451 | B1 * | 1/2007 | Dundas | F16L 57/04 |
| | | | | 138/109 |
| 8,291,941 | B1 * | 10/2012 | Berardi | F16L 11/20 |
| | | | | 138/109 |
| 8,936,046 | B2 * | 1/2015 | Ragner | F16L 11/118 |
| | | | | 138/119 |
| 2010/0147446 | A1 * | 6/2010 | Ciolczyk | F16L 9/133 |
| | | | | 156/191 |
| 2013/0087205 | A1 | 4/2013 | Berardi | |
| 2013/0180615 | A1 | 7/2013 | Ragner et al. | |
| 2014/0007881 | A1 * | 1/2014 | Rummery | A61M 16/0683 |
| | | | | 128/206.21 |
| 2014/0130930 | A1 * | 5/2014 | Ragner | F16L 11/118 |
| | | | | 138/121 |

* cited by examiner

EXTENSIBLE HOSE AND HOSE ASSEMBLY

TECHNICAL FIELD

The present invention concerns an extensible hose. More specifically, the present invention concerns an extensible hose particularly, but not exclusively, for applications like gardening and similar.

BACKGROUND ART

In the particular field of gardening extensible hoses for irrigation are known that offer the advantage of being able to reduce their bulk when they are not used. A hose of this type is normally made from an elastically stretchable material—for example natural or synthetic rubber, thermoplastic rubber (TPR)—which, under the action of the pressure of the fluid that flows through it, increases its length in use even by tens of times, as well as expanding in diameter.

This phenomenon thus allows for an irrigation hose having a length such as to satisfy the most common requirements of use, but that at the same time, when stowed or not used, has a much smaller bulk with respect conventional hoses.

In this condition, therefore, the hose can, for example, be easily transported; moreover, once the irrigation operation has ended, the hose can be particularly quickly and easily wound back up, to be able to then be stowed away.

One of the critical factors in the use of this type of hose is of course the resistance to perforation and/or laceration and/or to other external agents of the material used.

Indeed, in order to be able to ensure the necessary requirements of protection against such external agents, often in the design of these hoses the thickness of the hose is oversized.

This translates into an increase in the raw materials used, and therefore in the production costs of the object, as well as into an increase in the weight of the hose itself.

Moreover, the increase in thickness of the hose obviously also has an impact on the elastic properties thereof: as can be imagined, for the same pressure of the fluid, an increase in thickness results in a reduction of the stretching able to be obtained in the hose.

Therefore, the advantages that can be obtained thanks to the extensibility of the hose are substantially reduced where it is necessary to pay special attention, in the the design step, to the resistance of the hose itself to external agents.

Up to now various constructive solutions for this type of hose have been proposed, but none of them is considered particularly satisfactory in terms of the elongation that can be obtained and, jointly, that of the resistance to external agents.

For example, solutions have been devised in which the extensible hose is covered with a sheath made from fabric or another similar material.

Such a sheath is unable to provide sufficient guarantees in terms of resistance to external agents, and also tends to collect dirt and also to become impregnated with liquid possibly present on the ground on which it operates.

PURPOSES OF THE INVENTION

The aim of the present invention is to improve the state of the art.

In such a technical aim, a purpose of the present invention is to devise an extensible hose that provides optimal guarantees in terms of resistance to external agents, mainly mechanical and/or thermal agents, and/or in terms of the cleanliness and surface integrity of the product during use.

Another purpose of the present invention is to provide an extensible hose characterised by elastic properties, and thus elongation, suitable for all possible applications.

This aim and these purposes are accomplished by the extensible hose according to the present invention.

The extensible hose according to the invention comprises an inner tubular element suitable, in use, for being passed through by fluid.

Such an inner tubular element is made from a first elastically extensible material and suitable for elongating and widening under the action of the pressure of the fluid passing through it.

According to the invention, the extensible hose also comprises at least one extensible outer tubular element overlying, and being coaxial to, the inner tubular element.

The outer tubular element comprises at least one surface portion made from a second material resistant to external stresses, and the like.

Such an aim and such purposes are also achieved by a hose assembly comprising the aforementioned extensible hose and at least one fitting, associated with at least one end of the hose itself, for connection to means for supplying and/or dispensing fluid, according to the present invention.

The dependent claims refer to preferred and advantageous embodiments of the invention.

BRIEF DESCRIPTION OF THE DRAWINGS

The characteristics of the invention will become clearer to those skilled in the art from the following description and from the attached tables of drawings, given as a non-limiting example, in which.

MODES FOR CARRYING OUT THE INVENTION

Figure 1:
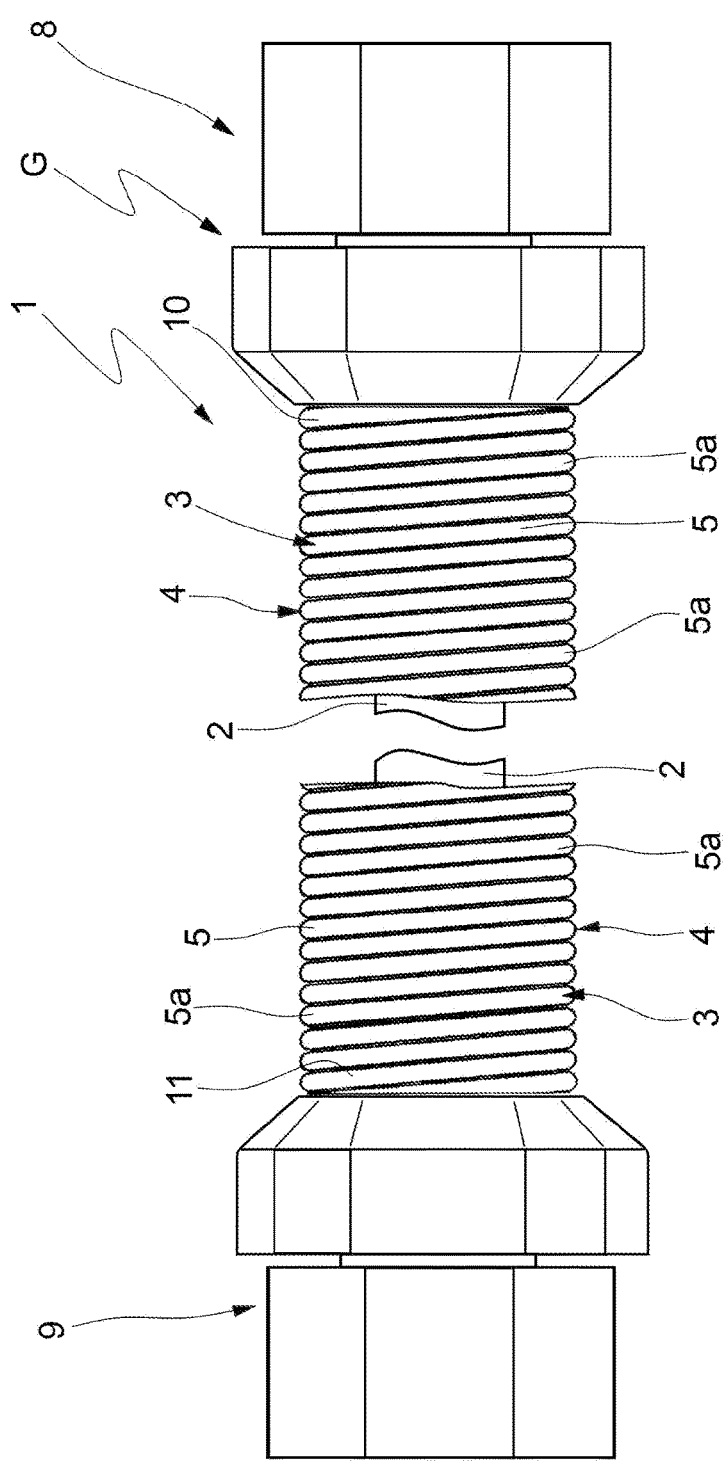
FIG. 1 is a side view of an extensible hose according to the invention, in inactive configuration.

With reference to the attached FIG. 1, an extensible hose according to the present invention is wholly indicated with 1.

The extensible hose 1 according to the present invention is particularly, but not exclusively, recommended for applications such as gardening and the like.

However, there are no particular restrictions against uses in applications of any other kind.

The extensible hose 1 comprises an inner tubular element 2.

The inner tubular element 2 is suitable, in use, for being passed through by fluid.

In the case of a gardening application, the fluid consists of irrigation water.

In other applications, the fluid that passes through the inner tubular element 2 can be another type, without particular limitations.

The inner tubular element 2 is made from a first elastically extensible material, and suitable for elongating and widening under the action of the pressure of the fluid.

For example, such a first material can be selected from natural rubber, synthetic rubber, thermoplastic rubber (TPR), latex, and the like.

Alternatively, such a first material can consist of a mixture of the aforementioned materials.

Other materials not listed above, but having equivalent technical characteristics, or mixtures thereof, can equally be used to make the inner tubular element 2.

According to an aspect of the present invention, the extensible hose 1 also comprises at least one extensible outer tubular element, wholly indicated with 3.

The outer tubular element 3 is overlying, and coaxial to, the inner tubular element 2.

The outer tubular element 3 comprises, according to the invention, at least one surface portion 4 made from a second material resistant to external stresses, and the like.

By external stresses we mean, for example, mechanical or thermal stresses, but also other kinds of stresses. Mechanical stresses can be caused, for example, by foreign bodies that cause a high compression of parts of the hose 1, or even pointed or sharp foreign bodies that can cause perforations or lacerations of the hose 1 itself.

Furthermore, mechanical stresses that are dangerous to the integrity of the hose can be caused by foreign bodies on which the hose 1 winds or catches accidentally.

Thermal stresses can, for example, be those of sun's rays during the hot periods of the year, or other.

It can easily be understood that the aforementioned stresses, which often occur simultaneously, can, after repeated use, compromise the integrity of the first material from which the inner tubular element 2 of the hose 1 is made.

Figure 2:
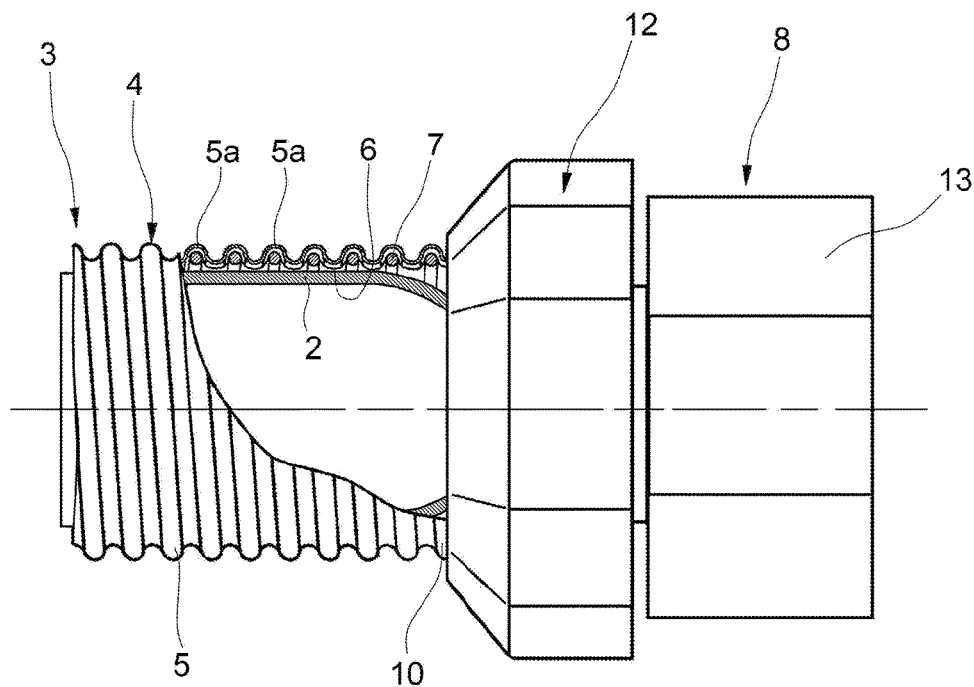
FIG. 2 is a detailed and partially sectioned side view of the hose of FIG. 1, in operative configuration.
Figure 3:
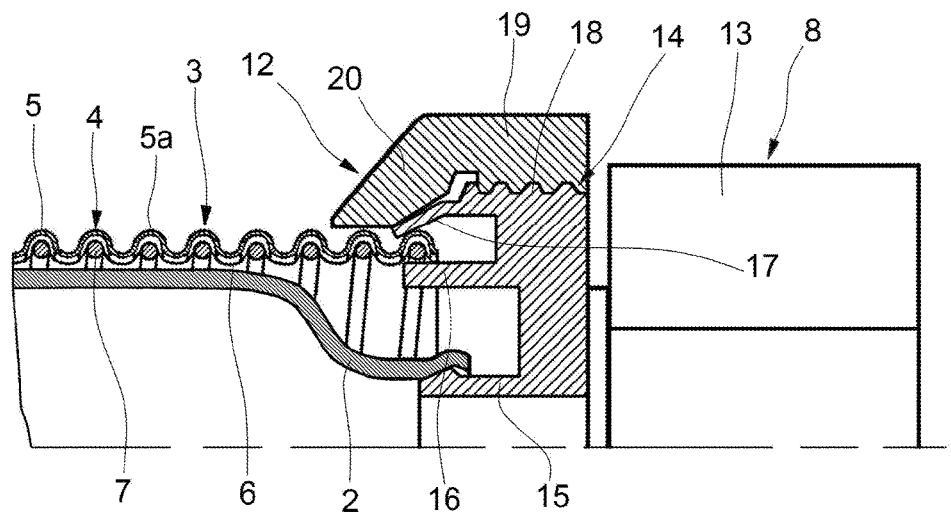
FIG. 3 is a detailed diametral section of the hose of FIGS. 1,2, in operative configuration.

With reference to FIGS. 1-3, and according to another aspect of the invention, the outer tubular element 3 of the hose 1 comprises at least one spiral hose 5.

In FIG. 1 the extensible hose 1 is represented in inactive configuration, i.e. without elongation.

In FIGS. 2,3, on the other hand, the hose 1 is represented in operative configuration, i.e. elongated by a certain amount.

The spiral hose 5 is elastically extensible in the axial direction.

The spiral hose 5 defines the aforementioned surface portion 4.

In greater detail, such a surface portion 4 extends over the entire outer surface of the spiral hose 5.

The second material from which the spiral hose 5 is made preferably consists of polymeric material such as PVC, PU (polyurethane), polyester, and the like.

This is a cost-effective and light material provided with good mechanical characteristics, with particular reference to resistance to concentrated stresses that could cause perforations or lacerations of the inner tubular element 2.

Moreover, the material from which the spiral hose 5 is made is completely impermeable, i.e. does not become impregnated in the slightest with liquids with which it could come into contact during use.

In some specific applications, the spiral hose 5 could be made from a composite material, i.e. comprise areas made from said second material and also areas made from a third material.

In other words, the spiral hose 5 could comprise surface portions 4 made from different materials, so as to differentiate the mechanical characteristics of the spiral hose 5 itself in different areas.

For example, the aforementioned third material could be a polymeric material with different characteristics with respect to those of the second material—for example a harder polymeric material—or even a metallic material, or still others.

With reference to the possibility of using a third material consisting of hard polymeric material or metallic material, in an embodiment of the invention the spiral hose 5 could comprise a continuous spiral strip, made from such a third material and fixed onto the outer surface of the hose 5 itself, in particular on the crest of the turns thereof.

Such a solution could ensure both the optimal extensibility of the spiral hose 5 in the axial direction, and the suitable mechanical strength of the surface portion 4 thereof, for example with reference to resistance to abrasion while the hose is being dragged on the ground during use.

Otherwise, the third material can for example be selected from materials able to reflect the sun's rays, so as to limit the overheating of the inner tubular element 2.

According to another aspect of the present invention, the outer tubular element 3 comprises at least one helical reinforcing element 6.

The helical reinforcing element is shaped like a cylindrical helical spring.

The helical reinforcing element 6 is inserted inside the spiral hose 5, and has its turns engaged in the seats defined internally by the turns 5a of the spiral hose 5, as illustrated in FIGS. 2,3.

The helical reinforcing element 6 can be made for example from metallic material, or from polymeric material having suitable characteristics, or from yet another material.

The helical reinforcing element 6, moreover, makes it possible to obtain a substantial increase in the resistance of the outer tubular element 3 with particular reference to localised compression/squashing stresses.

The helical reinforcing element 6 can be foreseen along the entire length of the spiral hose 5, or only on part of it, for example only in some sections of the spiral hose 5 itself.

According to a further aspect of the present invention, the outer tubular element 3 comprises a flexible tubular support 7 for the helical reinforcing element 6, illustrated in FIG. 3.

In particular, the turns of the helical reinforcing element 6 are permanently constrained to the tubular support 7.

The tubular support 7 is a continuous body, which completely encloses the inner tubular element 2.

In greater detail, the constraint between the tubular support 7 and the helical reinforcing element 6 must be carried out so as to ensure the extensibility of the helical reinforcing element 6 itself in the axial direction.

Therefore, the two components must be fixed together so that the tubular support 7 is sufficiently loose in the sections comprised between two consecutive turns of the helical reinforcing element 6 so that, indeed, its extensibility is ensured in the axial direction.

The tubular support 7 can be made from a polymeric material such as PVC, PE, PET, and the like, or from another suitable material.

For example, if the material from which the tubular support 7 is made is of the heat-shrinking type, the connection between the latter and the helical reinforcing element 6 is easily obtained by extruding the tubular support 7 on top of the helical reinforcing element 6, and the shrinking of the material as a consequence of the cooling causes its adhesion.

The tubular support 7, as well as ensuring that the helical reinforcing element 6 always stays correctly positioned with respect to the spiral hose 5—for example preventing some of the turn from accidentally moving during use—can also perform other functions connected with the use of the extensible hose 1.

For example, the tubular support 7 can be made from a material suitable for filtering ultraviolet radiation, or it can be coated with such a material, thus preventing the proliferation of organisms—for example algae—inside the inner tubular element 2.

According to another embodiment of the invention, the tubular support 7 can be made from a material having heat-insulating properties, so as to limit the overheating of the fluid inside the inner tubular element 2.

The object of the present invention is also a hose assembly G comprising the hose 1 described above and at least one end fitting 8,9 able to be associated with means for supplying and/or dispensing fluid.

In greater detail, in a preferred embodiment of the invention the hose assembly G comprises the hose 1, a first end fitting 8, and a second end fitting 9.

The first fitting 8 and the second fitting 9 can be respectively connected to a first end 10 and to a second end 11 of the hose 1.

The fittings 8,9 can be identical to each other, or can also be of different types.

Each of the fittings 8,9 comprises a respective connection portion 12 to the respective ends 10,11 of the hose 1.

Moreover, each of the fittings 8,9 comprises a respective coupling portion 13 with means for supplying and/or means for dispensing fluid, not represented in the figures.

The means for feeding fluid can consist, for example, of a water tap; the delivering means can consist, for example, of any known terminal.

In the embodiment of the hose of FIGS. 1-3, the connection portion 12 comprises peripheral screw means 14 for locking the outer tubular element 3.

Moreover, the connection portion 12 comprises a central tubular portion 15 on which the inner tubular element 2 can be slotted.

The peripheral screw means 14 can comprise, for example, an annular portion 16 on which the outer tubular element 3 is slotted, and a plurality of flexible fins 17 arranged along a circumference of greater diameter with respect to that of the annular portion 16.

Moreover, a threading 18 is foreseen along which a ring nut 19 having a frusto-conical end portion 20 can be screwed.

Thus by screwing the ring nut 19 along the threading 18, the frusto-conical end portion 20 compresses the flexible fins 17 so that the end of the outer tubular element 3 remains clamped between the annular portion 16 and the flexible fins 17 themselves.

Other technically equivalent solutions can be foreseen for the connection portion 12.

The coupling portion 13 can, on the other hand, consist of a quick fastener or similar, of the type essentially known in this type of object.

The invention thus conceived allows important technical advantages to be obtained.

Firstly—thanks to the presence of the outer tubular element 3—there is adequate protection of the extensible hose 1 from external stresses, whether mechanical, thermal or of another kind.

Furthermore, a solution is obtained that is completely impermeable to liquids, without having to add further protective layers.

The optimal extensibility of the hose 1 is also ensured, since the outer tubular element 3 is extensible in the axial direction, and also flexible, in a totally satisfactory manner with reference to the most common requirements of use.

These results are obtained with a solution that is constructively very simple and cost-effective.

Moreover, the use of the hose is also a pleasant experience, since it is particularly light and easy to manoeuvre.

Figure 4:
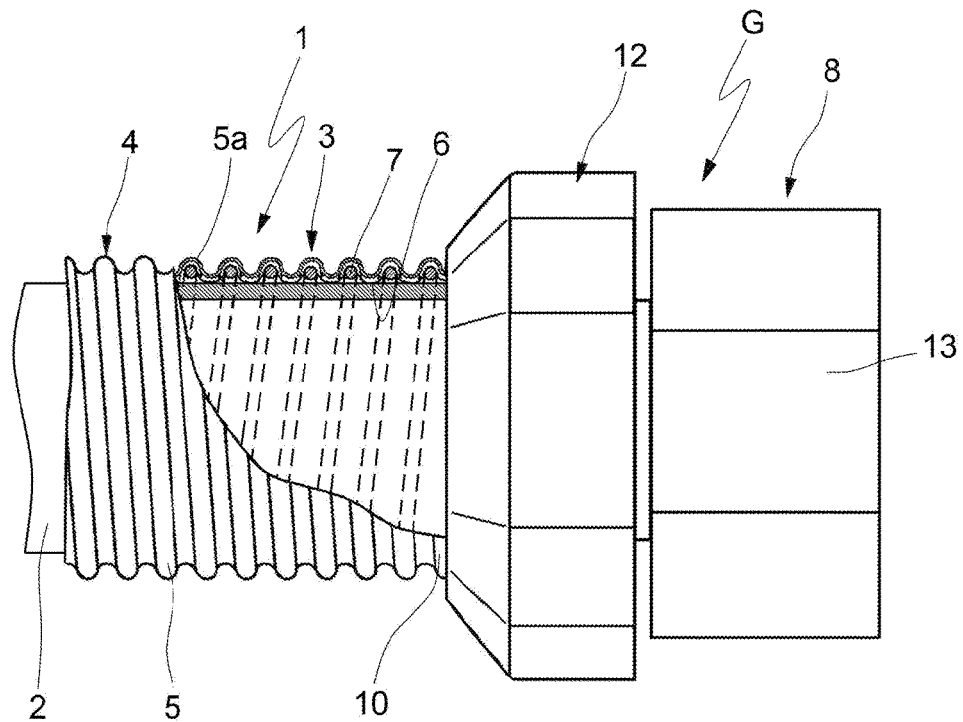
FIG. 4 is a detailed and partially sectioned side view of another embodiment of the hose according to the present invention.
Figure 5:
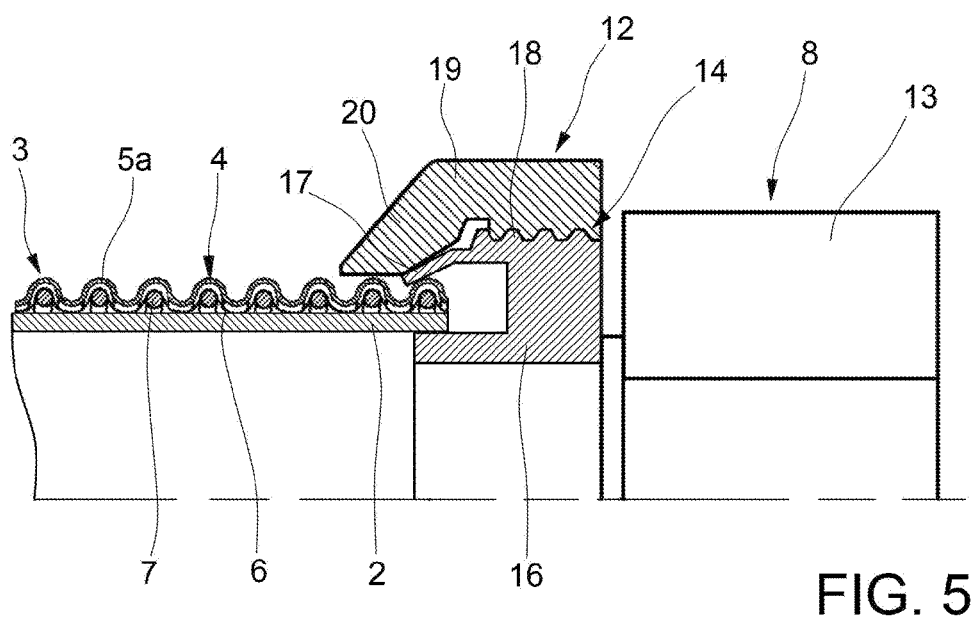
FIG. 5 is a detailed diametral section of the hose of FIG. 4.

Another embodiment of the flexible hose 1 according to the invention, and also of the hose assembly G according to the invention, is illustrated in FIGS. 4,5.

In such figures, the parts corresponding to those of the previous embodiment are indicated with the same reference numerals.

FIGS. 4,5 illustrate only an end portion of the hose 1, the opposite end being totally identical, or similar to it, differing only for not essential aspects.

In this embodiment, the extensible hose 1 differs from the previous embodiment solely in that the inner tubular element 2 is permanently connected to the outer tubular element 3.

In greater detail, according to an aspect of the invention, such a permanent connection is obtained through a hot co-extrusion process, or through similar processes.

The extensible hose 1 thus consists of a single piece, having, in a synergic manner, the mechanical characteristics of the single components.

Therefore, it is a particularly convenient and cost-effective solution mainly in terms of the connection to the fittings 8,9.

As illustrated in FIG. 5, indeed, the fittings 8,9 can be of the type in which the connection portion 12 is made up exclusively of the peripheral screw means 14, since it is not necessary to foresee a central tubular portion for the inner tubular element 2, like in the previous embodiment.

Figure 6:
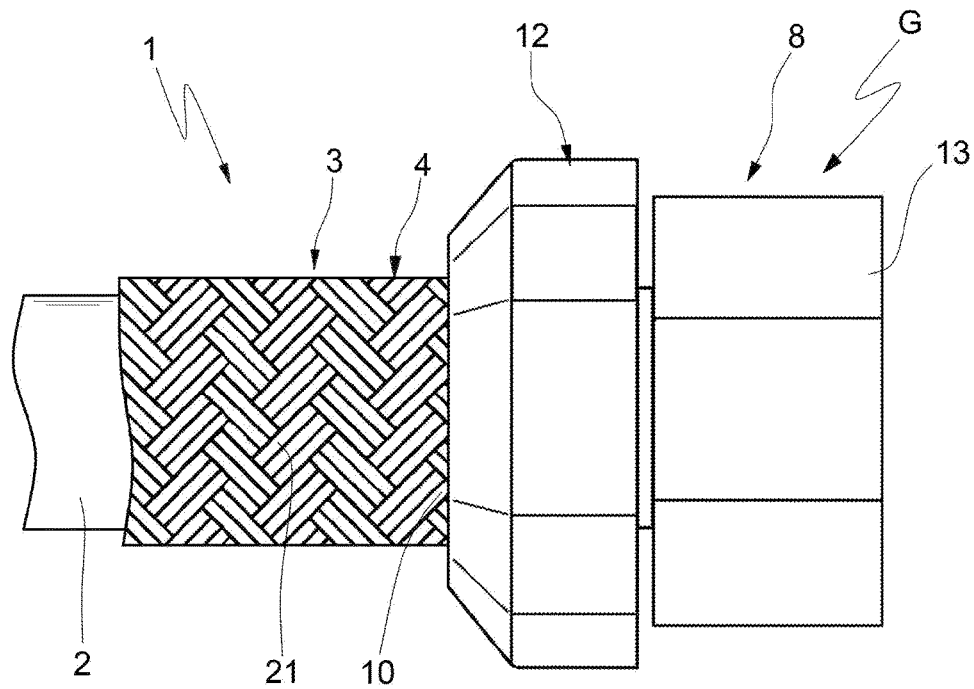
FIG. 6 is a detailed side view of another embodiment of the hose according to the present invention.
Figure 7:
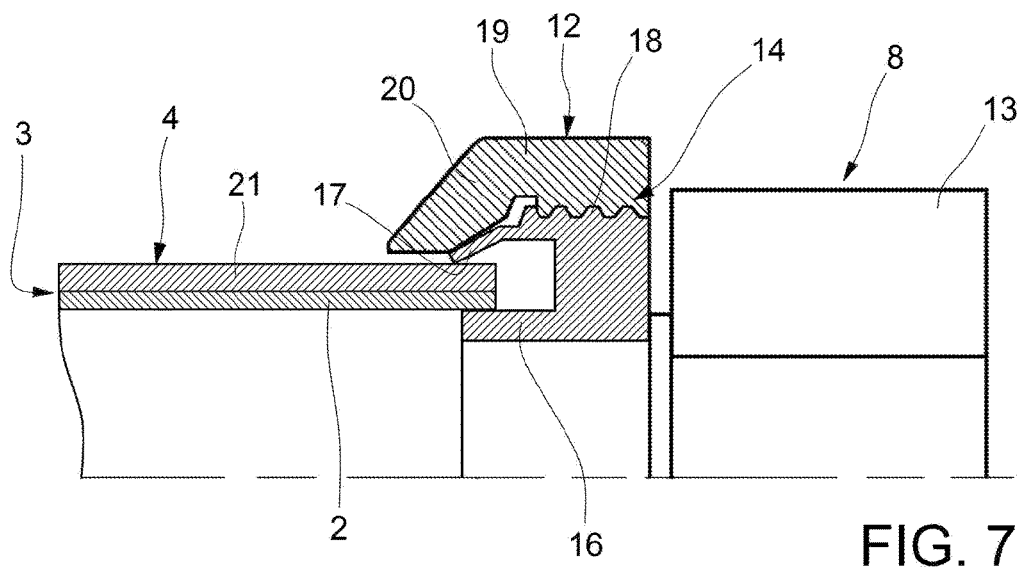
FIG. 7 is a detailed diametral section of the hose of FIG. 6.

Another embodiment of the extensible hose 1 according to the invention, and also of the hose assembly G according to the invention, is illustrated in FIGS. 6,7.

In such figures, the parts corresponding to the previous embodiments are indicated with the same reference numerals.

FIGS. 6,7 illustrate only an end portion of the hose and of the hose assembly G, the opposite one obviously being totally identical.

In this embodiment, the outer tubular element 3 comprises at least one layer of stretchable elastic fabric 21.

The layer of elastic fabric 21 defines the surface portion 4 of the outer tubular element 2.

In other words, the surface portion 4 resistant to external agents extends over the entire surface of the layer of elastic fabric 21.

The layer of elastic fabric 21 can, for example, consist of a mesh or tubular screening of any type, extensible in the axial direction.

In FIG. 6 the schematic representation of the layer of elastic fabric 21 should not be considered at all restrictive.

The layer of elastic fabric 21 is completely impermeable to the penetration of liquids coming from outside, mainly thanks to the material from which it is made and thanks to its particular very fine mesh.

The layer of elastic fabric 21 preferably adheres to the inner tubular element, so as to protect it more effectively.

The diametral dilation of the inner tubular element 2 must therefore be quite small.

The layer of elastic fabric 21 can be made from any material suitable for the application, preferably synthetic but possibly also natural, without any limitation.

The thickness of the layer of elastic fabric 21 must be such as to offer the necessary guarantees of protection from external stresses, for example mechanical, thermal or other.

The fittings 8,9 can be the same as described in the previous embodiment of FIGS. 4,5.

The present embodiment of the invention constitutes a particularly advantageous solution in terms of production costs.

Figure 8:
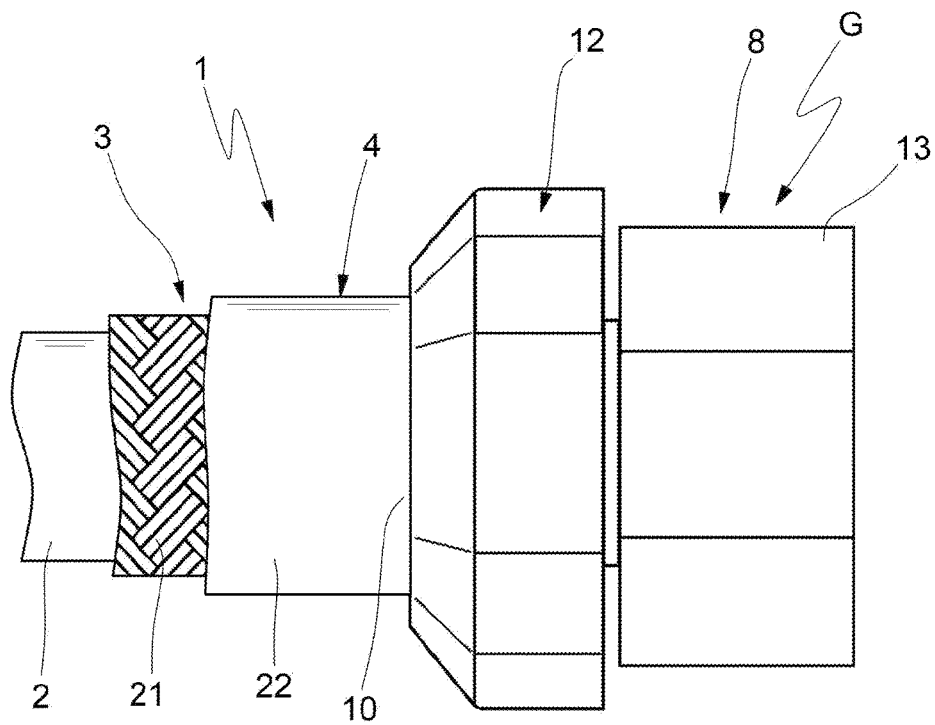
FIG. 8 is a detailed side view of another embodiment of the hose according to the present invention.
Figure 9:
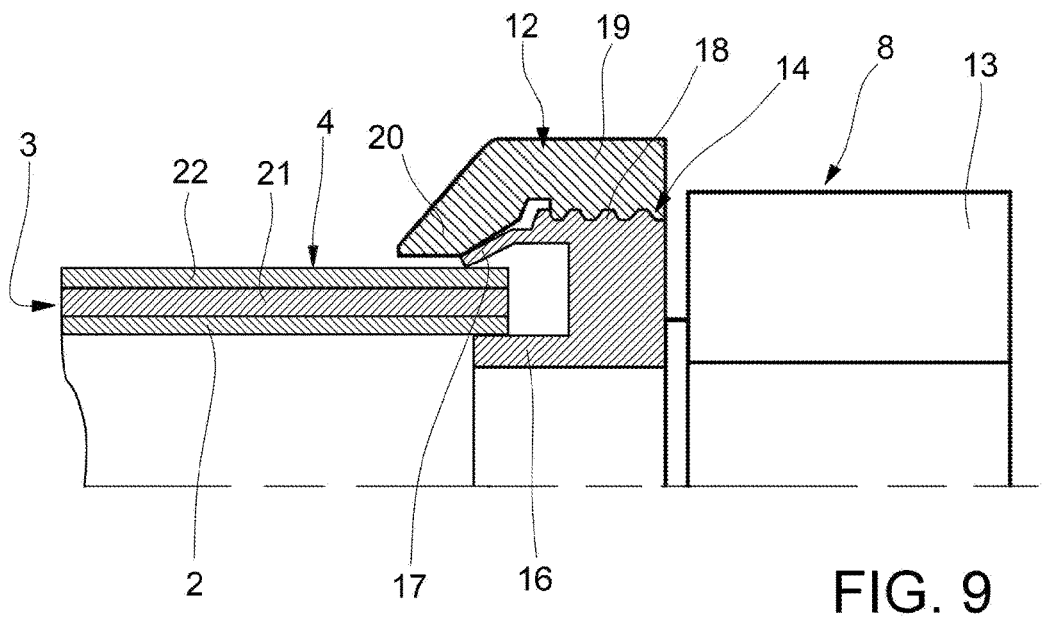
FIG. 9 is a detailed diametral section of the hose of FIG. 8.

Yet another embodiment of the extensible hose 1 according to the present invention, and also of the hose assembly G according to the invention, is illustrated in FIGS. 8,9.

In such figures, the parts corresponding to the previous embodiments are indicated with the same reference numerals.

FIGS. 8,9 illustrate only an end portion of the hose and of the hose assembly G, the opposite one being totally identical, or similar to it, differing only for non-essential aspects.

The present embodiment differs from that of FIGS. 6,7 in that the outer tubular element 3 further comprises a covering layer 22 made from elastically extensible material.

The covering layer 22 is placed on top of the layer of elastic fabric 21, and defines the surface portion 4 resistant to external stresses.

The covering layer 22 can be made from the same first material from which the inner tubular element 2 is made, or from another material of equivalent properties.

The covering layer 22 is made from a material completely impermeable to the penetration of liquids coming from outside.

The present embodiment, if compared with the previous one—FIGS. 6,7—is more complex in terms of production.

However, it has the advantage of comprising a surface portion 4, resistant to external stresses, which is smooth and even, which, for example, facilitates the sliding of the hose 1 on the ground, and its cleanliness.

Possible perforations, abrasions or lacerations of the covering layer 22—moreover very improbable—do not however reach the inner tubular element 2, thanks to the presence of the layer of elastic fabric 21.

In this case, the layer of elastic fabric 21 could be made using a more cost-effective material, since the presence of the covering layer 22 performs the important function of ensuring the total impermeability to penetration of liquids coming from outside.

The fittings 8,9 used to make the hose assembly G can be the same as described in the previous embodiments of FIGS. 4-7.

Figure 10:
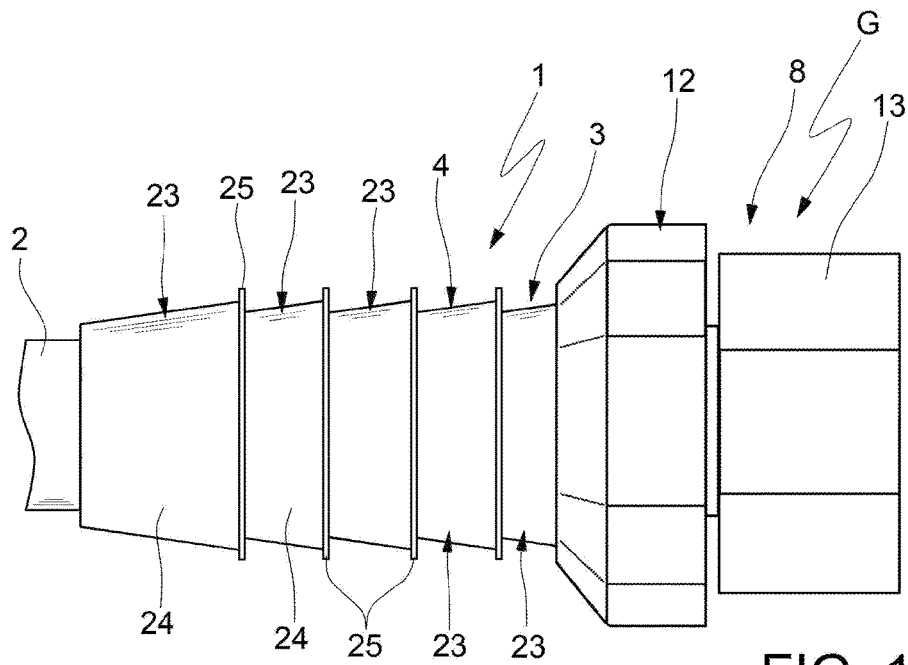
FIG. 10 is a detailed side view of yet another embodiment of the hose according to the present invention.
Figure 11:
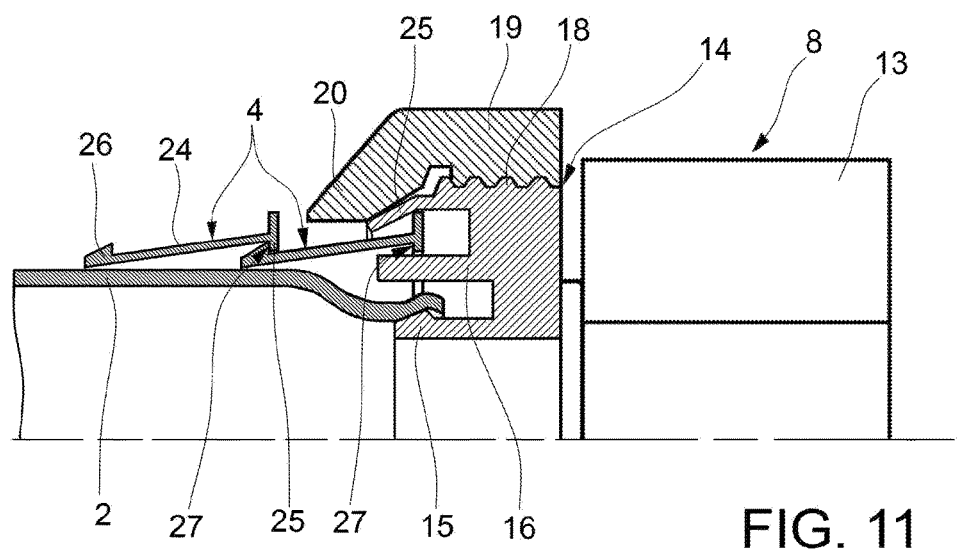
FIG. 11 is a detailed diametral section of the hose of FIG. 10.

Yet another embodiment of the extensible hose 1 according to the present invention, and of the hose assembly G according to the present invention, is illustrated in FIGS. 10,11.

In such figures, the parts corresponding to the previous embodiments are indicated with the same reference numerals.

FIGS. 10,11 illustrate only an end portion of the hose 1 and of the hose assembly G, the opposite one being totally identical, or similar to it, differing only for non-essential aspects.

In this embodiment, the outer tubular element 3 comprises a plurality of cup elements 23 that are substantially rigid and mutually interconnected, so as to be mobile with respect to each other axially and angularly with reference to the axis of the inner tubular element 2.

In greater detail, each of the cup elements 23 comprises a respective frusto-conical side portion 24, defining the surface portion 4 made from the second material resistant to external stresses.

Moreover, each of the cup elements 23 comprises a first edge 25 and a second opposite edge 26 of the side portion 24.

In particular, the first edge 25 defines an abutment surface 27 for the second edge 26 of the adjacent cup element 23, so as to make an axial interconnection of the cup elements 23 along the inner tubular element 2.

The second material from which each cup element 23 is made can, for example, be polymeric material such as PVC, PE, PET, or similar.

This is a material completely impermeable to the penetration of liquids coming from outside.

The outer tubular element 3 is thus extensible thanks to the possibility of the cup elements 23 to slide axially inside each other, for a predetermined stroke set by the designer.

The shape of the cup elements illustrated in FIGS. 10,11 is a non-restrictive example.

Different shapes of the cup elements 23 can be foreseen so as to obtain the same technical result.

The fittings 8,9 used to make the hose assembly G can be the same as described in the previous embodiment of FIGS. 1-3.

This solution has the advantage of constructive modularity, i.e. hoses 1 of different length can be obtained by simply varying the number of cup elements 23 foreseen.

Moreover, there are clear advantages also in terms of logistics and in particular in terms of storage and/or transportation costs, since the cup elements 23 can also be stored or transported disassembled.

In addition, this solution, with suitable sizing of the cup elements 23 and with suitable choice of the material from which to make them, ensures high characteristics of resistance to external stresses such as compressions, abrasion, perforations and/or lacerations.

Another embodiment of the extensible hose 1 according to the invention, and of the hose assembly G according to the invention, is illustrated in FIGS. 12-15.

In particular, in FIGS. 12-15 for the sake of simplicity only one of the fittings, in particular the first fitting 8, of the hose assembly G according to the invention is represented.

In this embodiment, the extensible hose 1 comprises an inner tubular element 2.

The inner tubular element 2 is made from a first elastically extensible material, and suitable for elongating under the action of the pressure of the fluid.

For example, such a first material can be selected from natural rubber, synthetic rubber, thermoplastic rubber (TPR), latex, and the like.

Alternatively, such a first material can consist of a mixture of the aforementioned materials.

The extensible hose 1 also comprises an outer tubular element 3; the outer tubular element 3 is placed over and coaxial to the inner tubular element 2.

The outer tubular element 3 can be elongated from a compact inactive configuration, to an extended operative configuration.

The outer tubular element 3 is completely impermeable, as made clearer hereafter.

The outer tubular element 3 comprises at least one surface portion 4 made from a second material resistant to external stresses, and the like.

According to the present embodiment of the invention, the outer tubular element 3 comprises a tubular support 7.

The aforementioned surface portion 4, in this case, consists of the tubular support 7 itself.

The tubular support 7 has a helical or spiral shape. Thanks to this shape, the tubular support is stretchable and, once extended, can spontaneously go back into the compact inactive configuration.

The tubular support 7 is a continuous body, which completely encloses the inner tubular element 2, which therefore is not accessible from the outside.

Therefore, the tubular support 7 is completely impermeable to the penetration of liquids coming from outside, since the second material from which it is made is completely impermeable.

The tubular support 7 is made from said second material, preferably, but not exclusively, consisting of PVC, PU (polyurethane), polyester, and the like.

The outer tubular element 3 also comprises a helical reinforcing element 6.

The helical reinforcing element 6 preferably, but not exclusively, has a circular or substantially circular section.

The helical reinforcing element 6 is basically shaped like a cylindrical helical spring.

According to an aspect of the invention, the helical reinforcing element 6 is incorporated, or embedded, inside the turns 7a of the tubular support 7.

In greater detail, the helical reinforcing element 6 is completely incorporated inside the turns 7a of the tubular support 7.

In other embodiments of the invention, the helical reinforcing element 6 could be only partially incorporated inside the turns 7a of the tubular support 7.

The helical reinforcing element 6 is preferably made from polymeric material having suitable characteristics.

In some alternative embodiments, the helical reinforcing element 6 could be made from metallic material, or another suitable material.

The helical reinforcing element 6 makes it possible to obtain a substantial increase in resistance of the outer tubular element 3 with particular reference to localised compression/squashing stresses.

The helical reinforcing element 6 can be foreseen along the entire length of the tubular support 7, or only on part of it, for example it could be foreseen only in some sections of the tubular support 7 itself.

According to an interesting aspect of the present invention, the outer tubular element 3—meaning an inseparable combination of tubular support 7 and helical reinforcing element 6—can be made with a co-extrusion process.

Such a process makes it possible, in an extremely quick and cost-effective manner, to obtain a high quality component that perfectly meets the technical requirements of the product.

The coupling between the tubular support 7 and the helical reinforcing element 6 makes it possible, with an extremely simple and cost-effective productive solution, with a minimal number of component, to obtain both the protective function against external agents such as mechanical and thermal agents (solar rays, accidental perforation of objects, etc.), and the function of total impermeabilization against the penetration of liquids coming from outside.

It is not absolutely necessary to apply further layers of impermeabilizing protective products.

Figure 12:
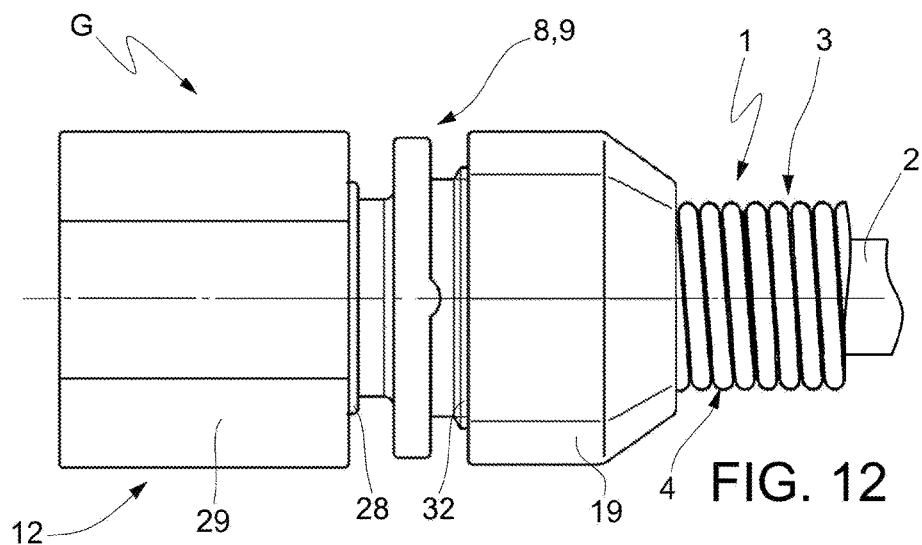
FIG. 12 is a detailed side view of another embodiment of the hose according to the invention.
Figure 13:
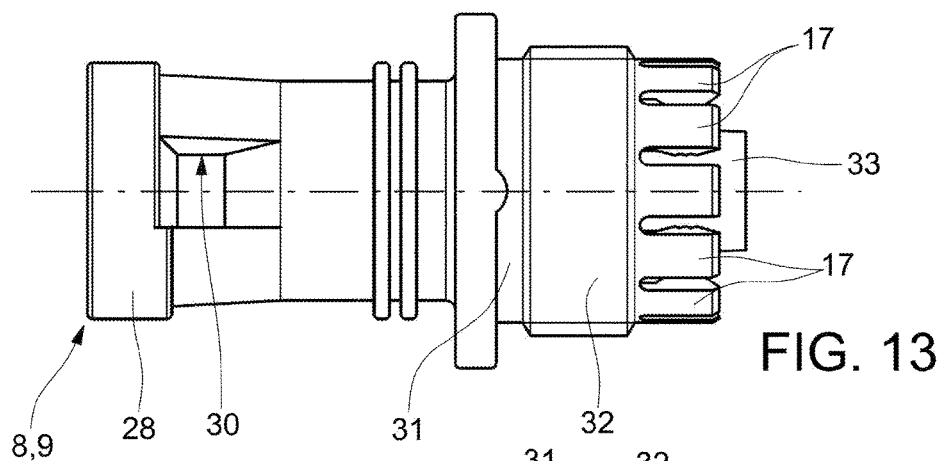
FIG. 13 is a detailed side view of the fitting of the hose according to the embodiment of FIG. 12.
Figure 14:
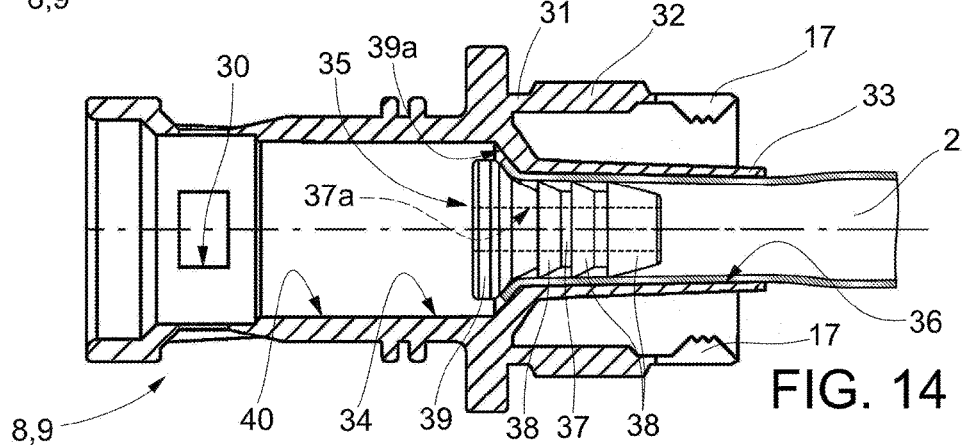
FIG. 14 is a detailed side view of the fitting partially assembled to parts of the hose.

In FIG. 12 the extensible hose 1 is illustrated in inactive configuration, i.e. compacted.

Figure 15:
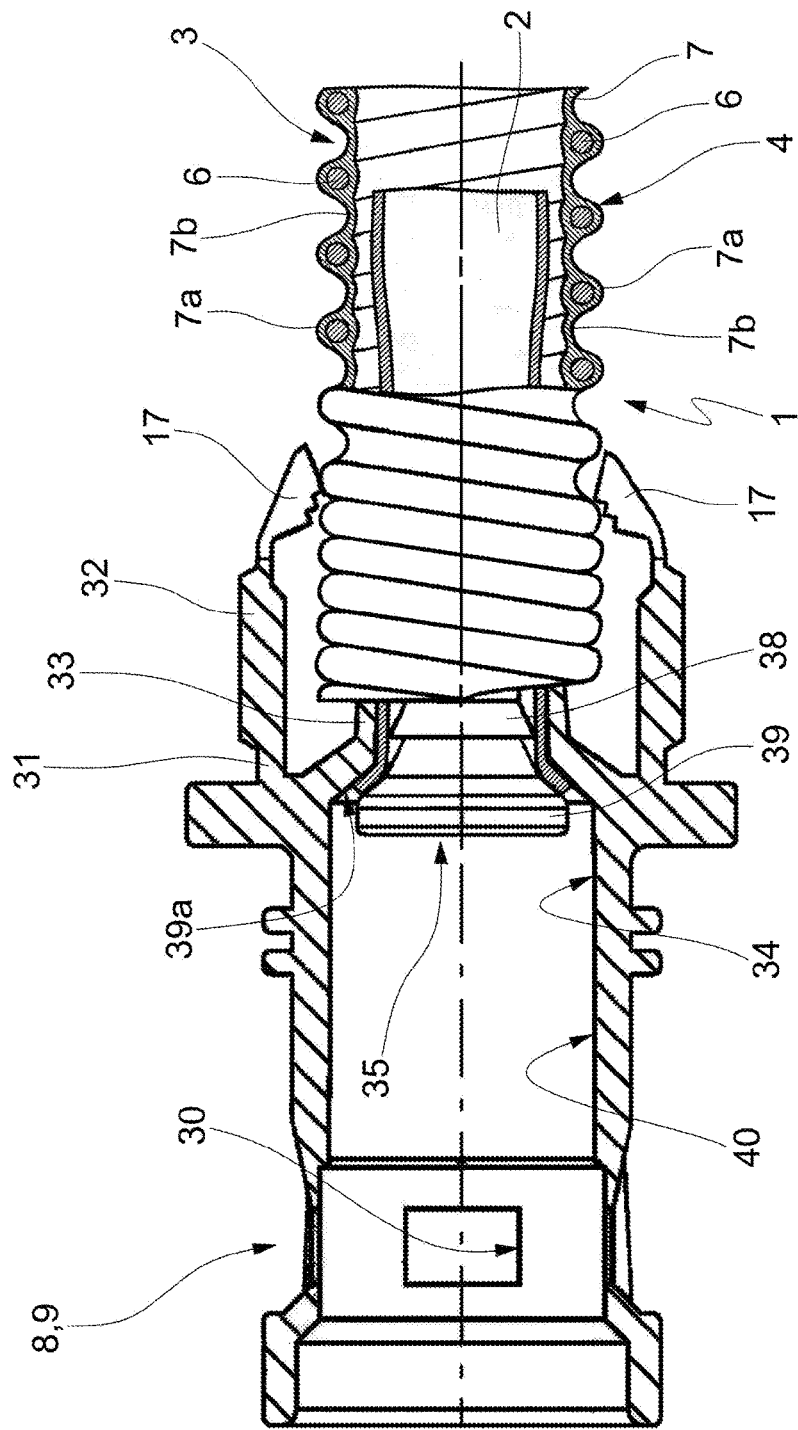
FIG. 15 is a detailed and partially sectioned side view of the hose according to the embodiment of FIGS. 12-14.

In FIG. 15, on the other hand, the extensible hose 1 is illustrated in operative configuration, i.e. extended, in particular in its portion coming out from the first fitting 8.

As it can be understood, in the extended configuration of the hose 1 it is possible to clearly see the interspaces 7b of the tubular support 7 foreseen between the turns 7a, which on the other hand are not visible when the hose 1 is in inactive configuration. This can make it possible to obtain certain aesthetic effects in relation to the colour of the single portions 7a,7b, effects that can clearly change in relation to the specific configuration taken up by the hose 1.

In a particular embodiment of the invention, the tubular support 7 could be made from a transparent or substantially transparent material; this makes it possible, with the hose 1 in extended configuration, to see the underlying inner tubular element 2.

This provision could also allow particular aesthetic effects to be obtained based on suitable chromatic contrasts.

According to another aspect of the invention, the first fitting 8 of the hose assembly G—and possibly also the second fitting 9, not represented in the figures, but in any case present—is made according to the solution described hereafter.

Hereafter, reference will thus be made, for the sake of simplicity, generically to the fitting 8,9 of the hose assembly G.

The fitting 8,9 comprises a connection portion 12 for example to a tap, a dispensing gun, or similar, or other means for supplying/dispensing a fluid.

The connection portion 12 comprises, for example, a tubular support area 28, with which a sliding locking element 29 is associated.

The tubular support area 28 comprises a plurality of windows 30, in which teeth—not visible in the figures—can selectively engage, which are foreseen in the inner surface of the sliding locking element 29.

Therefore, a manual translation of the sliding locking element 29 along the tubular support area 28 can cause the engagement or disengagement of the aforementioned teeth inside the respective windows 30.

In the case in which the teeth are engaged inside the windows 30, they project inside the tubular support area 28, and thus effectively create a locking constraint, for example, at the dispensing opening of a tap or at the inlet opening of a dispensing gun, or similar.

The fitting 8,9 also comprises an outer tubular portion 31, provided with a plurality of peripheral flexible fins 17.

The flexible fins 17 are suitable for abutting on the outer surface 4 of the first tubular element 2, through the action of a ring nut 19.

In particular, the outer tubular portion 31 comprises a threaded portion 32 on which the ring nut 19 is screwed: by moving the ring nut 19 along the threaded portion 32, it is possible to determine a more or less accentuated flexing of the flexible fins 17, so as to bring them into contact, with the desired surface pressure, on the outer surface 4 of the extensible hose 1.

The fitting 8,9 also comprises an inner tubular portion 33, coaxial to the outer tubular portion 31.

The inner tubular portion 33, together with the tubular support area 28 with which it communicates, defines an axial passage channel 34 for the liquid through the fitting 8,9.

The outer tubular element 3 of the extensible hose 1 is slotted onto the inner tubular portion 33 of the fitting 8,9, as shown in FIG. 15.

As can be observed in the same FIG. 15, the pressure exerted by the flexible fins 17 makes it possible to make an effective hydraulic seal of the outer tubular element 3 on the inner tubular portion 33 of the fitting 8,9.

Moreover, a perfect air seal is also obtained between the inner tubular element 2 and the outer tubular element 3.

In some cases it could be preferable to decompact the first section of the outer tubular element 3, so as to make the abutment of the flexible fins 17 on its outer surface 4 easier and more stable.

The mechanical connection between the inner tubular element 2 and the fitting 8,9 is, on the other hand, obtained through an insert 35.

In particular, the insert 35 is suitable for constraining the inner tubular element 2 to the fitting 8,9 inside the cavity 36 of the inner tubular portion 33 of the fitting 8,9 itself.

In greater detail, the insert 35 comprises a cylindrical portion 37 along which there are conical annular reliefs 38, and a head 39 of greater diameter. The cylindrical portion 37 has a longitudinal through hole 37a in it for the liquid to flow through.

The inner tubular portion 33 is defined by a countersunk annular abutment 39a, foreseen substantially at the central portion of the fitting 8,9; the countersunk annular abutment 39a joins to a portion with greater diameter 40 of the passage channel 34, foreseen along the area of tubular support 28.

In practice, the insert 35 is inserted at the end of the inner tubular element 2 with its own cylindrical portion 37: the conical annular reliefs 38 of the insert 35 cause a local widening of the inner tubular element 2 itself, so as to make a stable connection between the two parts.

The inner tubular element 2 is also inserted into the passage channel 34 of the fitting 8,9, starting from the opposite end to that in which the insert 35 is foreseen: once insertion is complete, the end of the inner tubular element 2 remains firmly locked, thanks to its high elastic deformability, between the countersunk annular abutment 39a and the head 39.

The diameter of the cavity 36 and of the insert 35—in particular of the conical annular reliefs 38—can be suitably sized so as to obtain the desired radial deformation of the end of the inner tubular element 2, and consequently a greater or lesser degree of friction between the components.

It should be observed that, in use, the pressure of the liquid dispensed acts in the direction of insertion of the insert 35 in the cavity 36, and thus increases and promotes the hydraulic seal between the components.

In all of the embodiments described, with an extremely simple and cost-effective productive solution, with a minimal number of component, both the protective function against external agents such as mechanical and thermal agents (solar rays, accidental perforation of objects, etc.), and the function of total impermeabilization against the penetration of liquids coming from outside are effectively obtained.

The external appearance of the product is clean and regular, so that possible accumulation of dirt during use is prevented.

It has thus been seen how the invention achieves the proposed purposes.

The present invention has been described according to preferred embodiments, but equivalent variants can be devised without departing from the scope of protection offered by the following claims.

The invention claimed is:

1. An extensible hose for gardening irrigation, the extensible hose comprising:
   an inner tubular element suitable, in use, for being passed through by a fluid, said inner tubular element being made from a first elastically extensible material and suitable for lengthening and widening under action of a pressure of the fluid; and
   at least one extensible outer tubular element overlying, and coaxial to, said inner tubular element, said at least one extensible outer tubular element comprising at least one surface portion made from a second material resistant to external stresses, said outer tubular element comprising at least one layer of stretchable elastic fabric and a covering layer, said covering layer being made from elastically extensible material, said covering layer being placed on top of said layer of fabric, said covering layer defining said surface portion resistant to external stresses.

2. An extensible hose according to claim 1, wherein said at least one surface portion extends over an entire surface of said at least one extensible outer tubular element.

3. A hose assembly, comprising:
   an extensible hose for garden irrigation, the extensible hose comprising an inner tubular element suitable, in use, for being passed through by a fluid, said inner tubular element being made from a first elastically extensible material and suitable for lengthening and widening under action of a pressure of the fluid, said extensible hose further comprising at least one extensible outer tubular element overlying, and coaxial to, said inner tubular element, said at least one extensible outer tubular element comprising at least one surface portion made from a second material resistant to external stresses, said outer tubular element comprising at least one layer of stretchable elastic fabric and a covering layer, said covering layer being made from elastically extensible material, said covering layer being placed on top of said layer of fabric, said covering layer defining said surface portion resistant to external stresses; and
   at least one fitting for connection to a means for supplying and/or dispensing the fluid.

4. A hose assembly according to claim 3, wherein said at least one fitting comprises an insert suitable for a mechanical connection of said inner tubular element to said at least one fitting.

5. A hose assembly according to claim 4, wherein said insert is suitable for constraining said inner tubular element inside a cavity of an inner tubular portion of said at least one fitting.

6. A hose assembly according to claim 5, wherein said insert comprises a cylindrical portion along which there are conical annular reliefs, and a head of greater diameter, said inner tubular element being able to be engaged between said conical annular reliefs and said cavity of said inner tubular portion.

7. A hose assembly according to claim 6, wherein the end of said inner tubular element is configured to be locked between said head of said insert and a countersunk annular abutment provided in said inner tubular portion.

8. An extensible hose according to claim 1, wherein said layer of elastic fabric consists of a mesh or tubular screening, extensible in the axial direction.

9. An extensible hose according to claim 1, wherein said layer of elastic fabric adheres to said inner tubular element.

10. An extensible hose according to claim 1, wherein said layer of elastic fabric is made of synthetic material.

11. An extensible hose according to claim 1, wherein said covering layer is made from a material completely impermeable to penetration of liquids coming from the outside.

12. An extensible hose according to claim 11, wherein said covering layer is made from said first elastically extensible material or from another material having equivalent properties as said first elastically extensible material.

13. An extensible hose according to claim 1, wherein said first elastically extensible material comprises one of natural rubber, synthetic rubber, thermoplastic rubber, latex and a mixture comprising one or more of natural rubber, synthetic rubber, thermoplastic rubber and latex.

14. An extensible hose for gardening irrigation, the extensible hose comprising:
an inner tubular element suitable, in use, for being passed through by a fluid, said inner tubular element being made from a first elastically extensible material and suitable for lengthening and widening under action of a pressure of the fluid;
at least one extensible outer tubular element overlying, and coaxial to, said inner tubular element, said at least one extensible outer tubular element comprising at least one surface portion made from a second material resistant to external stresses, said outer tubular element comprising at least one layer of stretchable elastic fabric and a covering layer, said covering layer comprising an elastically extensible material, said covering layer being in direct contact with said layer of fabric, said covering layer defining an outermost surface of said outer tubular element and said covering layer defining said surface portion resistant to external stresses, said covering layer extending continuously, without interruption, in an axial direction of said outer tubular element with respect to a longitudinal axis of said outer tubular element from one end of said at least one layer of stretchable elastic fiber to another end of said layer of stretchable elastic fiber.

15. An extensible hose according to claim 14, wherein at least a portion of said covering layer is located at a position located radially beyond said inner tubular element with respect to a longitudinal axis of said inner tubular element, said covering layer completely covering each portion of said at least one layer of stretchable elastic fabric.

16. An extensible hose according to claim 14, wherein said layer of elastic fabric consists of a mesh or tubular screening, extensible in the longitudinal direction.

17. An extensible hose according to claim 14, wherein said layer of elastic fabric adheres to said inner tubular element.

18. An extensible hose according to claim 14, wherein said layer of elastic fabric is made of synthetic material.

19. An extensible hose according to claim 14, wherein said covering layer is made from a material completely impermeable to penetration of liquids coming from the outside.

20. An extensible hose according to claim 19, wherein said covering layer is made from said first elastically extensible material or from another material having equivalent properties as said first elastically extensible material.

\* \* \* \* \*